United States Patent [19]

Coder

[11] 4,033,803

[45] July 5, 1977

[54] DOUBLE ADHESIVE MASKING TAPE

[76] Inventor: Glen L. Coder, 942 Millburg, La Puente, Calif. 90602

[22] Filed: Nov. 2, 1976

[21] Appl. No.: 738,097

[52] U.S. Cl. .................................. 156/71; 118/505; 427/208; 427/282; 428/41

[51] Int. Cl.[2] .......................................... B32B 7/10

[58] Field of Search ............... 428/40, 41; 427/208, 427/282; 156/536, 545, 71; 118/505

[56] References Cited

UNITED STATES PATENTS

| | | | |
|---|---|---|---|
| 2,210,233 | 8/1940 | De Lillo | 118/505 |
| Re. 19,128 | 4/1934 | Drew | 427/208 |

*Primary Examiner*—Edward G. Whitby

*Attorney, Agent, or Firm*—Edgar W. Averill, Jr.

[57] ABSTRACT

An improved method for masking a portion of a surface in preparation for painting a surface. The method utilizes the step of adhering a strip of masking tape which is fully coated on one surface and the other surface of which is partly coated and partly uncoated with a pressure sensitive adhesive. The masking tape is first placed with the fully coated surface against the edge of the surface to be masked and with the uncoated outer surface position in the direction of the surface to be painted. A conventional paper and adhesive covering sheet is then affixed to the aforementioned masking tape to complete the masking operation.

5 Claims, 5 Drawing Figures

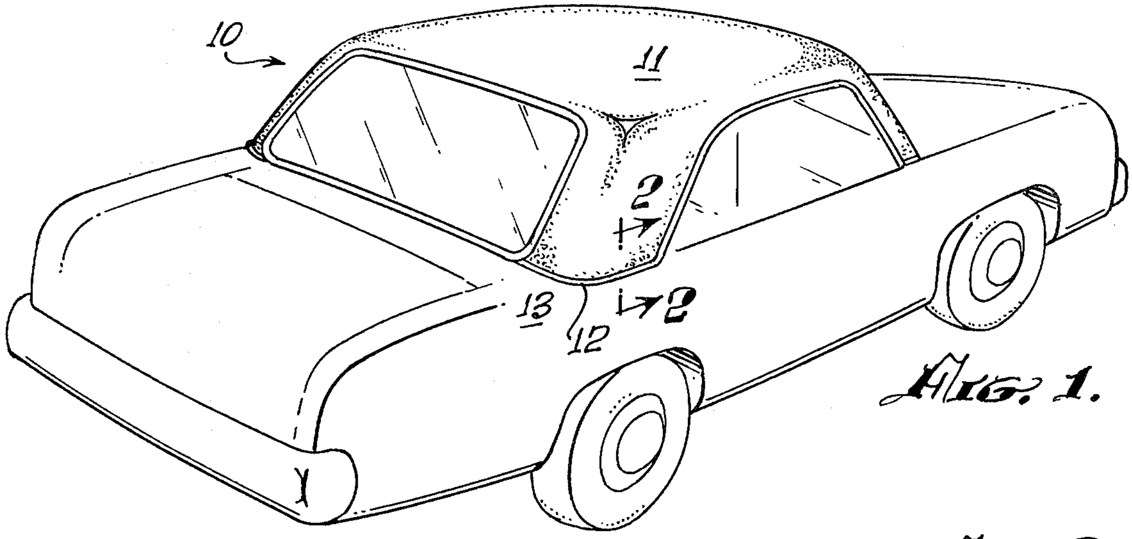
FIG. 1.
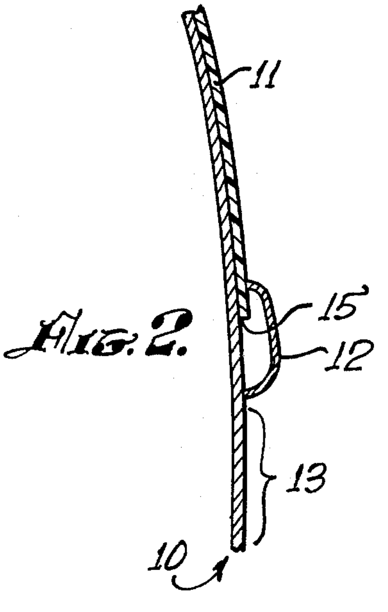
FIG. 2.
FIG. 3.
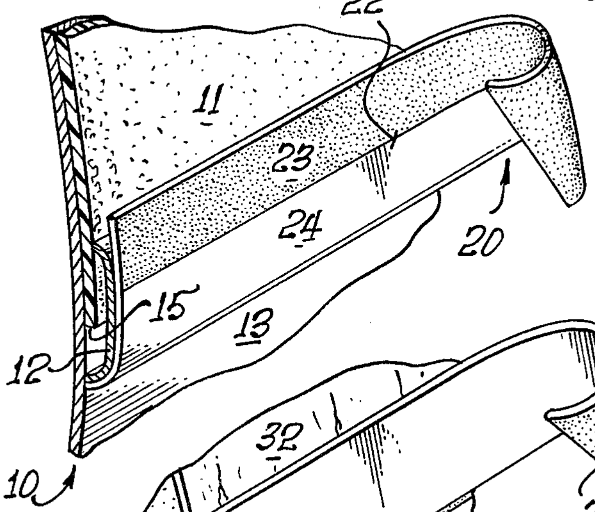
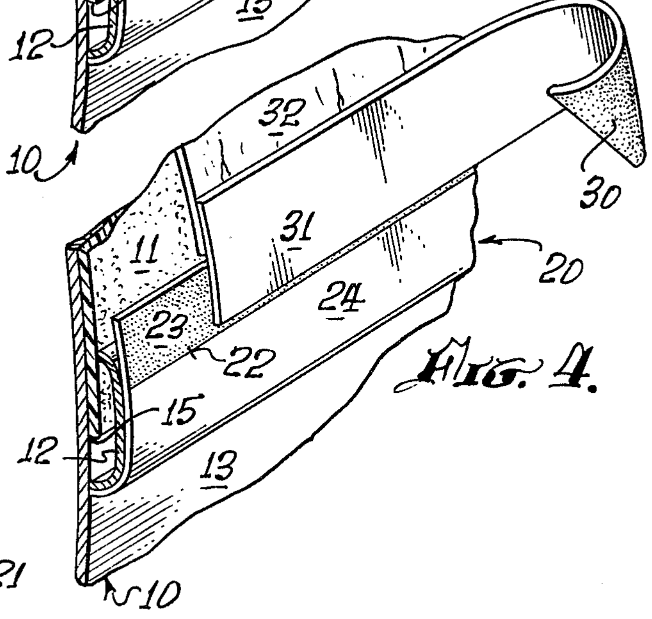
FIG. 4.
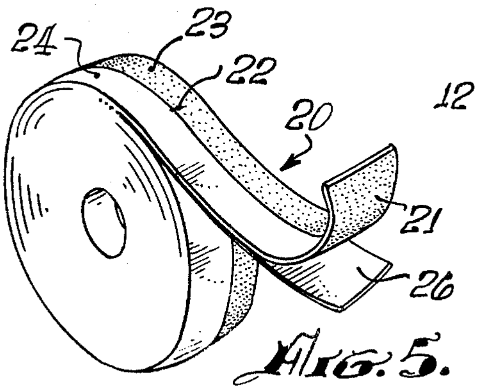
FIG. 5.

DOUBLE ADHESIVE MASKING TAPE

BACKGROUND OF THE INVENTION

The masking of a portion of an article or surface to be painted is a common step in many painting processes from the painting of architectural structures to motor vehicles and the like. A widely accepted method involves the use of a combined paper and pressure sensitive adhesive tape strip such as that shown in U.S. Pat. No. 2,374,103. Although the combined paper and adhesive tape has found wide acceptance, it has several significant shortcomings. The shortcomings are particularly present in the painting of motor vehicles and particularly motor vehicles having a vinyl or other plastic or fabric top. Whereas an unintentionally painted window or chrome strip may be readily cleaned, a vinyl surface often cannot be cleaned without defacing the vinyl. For this reason, it is especially important that the vinyl top of the vehicle be securily protected from spray paint.

With the use of the conventional protective paper and adhesive tape strip the bond between the masking material and the automobile is the adhesive strip positioned along the edge of the paper. Because the paper itself is bulky, it is often difficult to position the paper accurately so that the adhesive strip carefully follows the line of demarcation between the area to be painted and that to be masked. Furthermore, because of the inherent difficulty in handling the paper and adhesive strip, portions of the adhesive strip may become coated with oil or grease. Under the stress caused by a blast of air or of the spray paint, the adhesive tape can pull away slightly from the masked area permitting paint to escape under the protective coating.

SUMMARY OF THE INVENTION

It is thus an object of the present invention to provide an improved method for the masking of surfaces to be painted and more particularly the masking of portions of motor vehicles to prevent the inadvertent painting of a masked area.

The present invention is for an improved method for masking the portion of a surface in preparation for painting the unmasked portion thereof. The method is of the type which utilizes a combined paper strip and adhesive tape protective sheet. Before affixing this combined sheet, a strip of masking tape having a first principal side completely coated with a pressure sensitive adhesive and having only a portion of its other principal side coated with a pressure sensitive adhesive is adhered to the line of demarcation between the area to be painted and that to be masked. The fully coated side of the masking tape is placed against the surface to be masked and the partially coated surface faces outwardly with the uncoated portion pointing toward the area of the surface to be painted. After this masking tape is securely pressed at the interface, the conventional paper and adhesive tape protective sheet is adhered to the tape by touching the pressure sensitive part of the adhesive tape to the coated portion of the masking tape thereby forming a highly secure bond.

BRIEF DESCRIPTION OF THE DRAWINGS

FIG. 1 is a perspective view of an automobile having a vinyl top.

FIG. 2 is an enlarged cross sectional view taking along line 2—2 of FIG. 1.

FIG. 3 is a perspective view of the area of the auto body shown in FIG. 2 having a strip of doubly coated masking tape adhered thereto.

FIG. 4 is a perspective view similar to FIG. 3 further including the conventional masking tape and paper protective sheet.

FIG. 5 is a perspective view of a roll of the masking tape useful in the practice of the present invention.

Turning now to FIG. 1, an automobile 10 is shown in perspective view. Auto 10 has a vinyl top 11 which is adhered over the conventional metal top of the automobile. A chrome or stainless steel strip 12 is positioned at the interface between the vinyl top 11 and painted portion 13 of the auto body.

As shown in enlarged cross-sectional view in FIG. 2, the vinyl top 11 is adhered to the auto body and the bottom of vinyl top 11 is indicated by reference character 15 which is conventionally positioned under a molding or chrome strip 12 affixed to the auto body.

In the past, a strip of paper and masking tape was prepared from an apparatus such as that shown in U.S. Pat. No. 2,374,103. The adhesive strip portion of this combination was pressed against molding 12. However, because of the relatively large bulk of the paper and masking tape combination, it was often difficult to accurately position the masking tape at the exact interface between molding 12 and painting area 13. Furthermore, because of the curves inherently involved in most masking operations and the flat non-bending nature of the conventional paper and masking tape, a failure to get a complete secure bond between the molding and the masking tape resulted.

In the practice of the present invention, a relatively thin strip of masking tape, taken from a roll such as that shown in FIG. 5 of the drawings, may be adhered to the molding 12 in a manner shown in FIG. 3. The masking tape strip useful in the practice of the method of the present invention is indicated by reference character 20. As shown in FIG. 5, the innerside 21 of tape 20 is completely coated with a pressure sensitive adhesive whereas the outer side 22 of tape 20 has approximately one-half of its surface coated with a pressure sensitive adhesive 23. The remaining half 24 of the outer side 22 is uncoated. A layer of silicone paper tape 26 prevents the sticking of innerside 21 with coated half 23.

In use, tape 20 is placed with its innerside 21 against molding 12 with the coated half 23 of the outer surface positioned in a direction of the vinyl top 11. The uncoated half 24 is positioned in a direction toward the surface to be painted 13. The fact that the lower one-half of the outer surface of tape 20 as shown in FIG. 3 is uncoated, permits the tape to be more readily pressed against the molding or chrome strip 12. Furthermore, since tape 20 is relatively narrow and thus relatively pliable it may readily follow the curve of chrome strip 12 in a manner far easier than that possible with the conventional masking tape and paper material previously used.

The second step, namely that of adding the conventional adhesive or masking tape and paper combination now becomes relatively simple because the adhesive surface 30 of conventional masking tape 31 may now be touched to coated half 23 of tape 20 and a very strong and secure bond immediately forms with a minimum of contact being necessary.

It has been found that by utilizing tape 20 in the practice of the present invention a far more secure bond is formed with the conventional masking tape and paper then heretofore possible. Even with direct compressed air sprayed against the covered chrome strip 12 the tape 20 and conventional masking tape and paper are securely held over the vinyl top 11.

The proportion of the outer surface 22 of tape 20 which is coated with the pressure sensitive adhesive is not critical. However, it should be sufficient so that it will form a secure bond with the conventional masking tape 31 and yet leave sufficient uncoated outer area so that tape 20 may be easily pressed against the surface to be masked. The uncoated portion 24 of tape 20 is important for several reasons. First, it facilitates the pressing of the tape against the surface to be masked. Second, it prevents the undesired positioning of conventional masking tape 31. This mis-position can readily occur because of the propensity of a pressure sensitive adhesive to stick to another pressure sensitive adhesive surface. Therefore, if surface 30 of conventional tape 31 were to touch the uncoated portion of tape 24 it could be readily removed. However, if surface 24 were coated, such removal would not be possible. Thus the result is a far more rapid and accurate masking process than heretofore possible. The width of tape 20 should preferably be between about ¾ and 2 inches with 1½ inches being preferred. At least ¼ of the outer surface of tape 20 should be coated with an adhesive with ⅓ to ½ being preferred.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. An improved method for masking a portion of a surface in preparation for painting the unmasked portion thereof, the method being of the type utilizing a protective sheet of paper having an adhesive strip adhered along an edge thereof, wherein the improvement comprises:

adhering a strip of masking tape having a first principal side completely coated with a pressure sensitive adhesive and having its second principal side having a longitudinal area coated with a pressure sensitive adhesive and the remainder of this second side being free of adhesive, said adhering step being carried out so that the first side of the strip covers the edge of the area to be masked and the second side of the tape is positioned toward the area to be painted; and adhering a combined protective paper and adhesive strip assembly to said masking tape by contacting the pressure sensitive portion of the adhesive tape to the portion of the masking tape which is coated with the pressure sensitive adhesive

2. The method of claim 1 wherein said masking tape has at least ¼ of its second side coated with a pressure sensitive adhesive.

3. The method of claim 2 wherein from about ⅓ to ½ of the second side of the masking tape is covered with the pressure sensitive adhesive.

4. The method of claim 1 wherein said masking tape is between about ¾ and about 2 inches in width.

5. The method of claim 4 wherein said masking tape is about 1½ inches in width.

* * * * *